US006765148B2

(12) United States Patent
Rix

(10) Patent No.: US 6,765,148 B2
(45) Date of Patent: Jul. 20, 2004

(54) C-SHAPED GROMMET

(75) Inventor: Anthony Rix, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/426,413

(22) Filed: Apr. 30, 2003

(65) Prior Publication Data

US 2003/0221855 A1 Dec. 4, 2003

Related U.S. Application Data

(60) Provisional application No. 60/376,980, filed on Apr. 30, 2002.

(51) Int. Cl.[7] .................................................. H02G 3/18
(52) U.S. Cl. .............. 174/65 G; 174/65 R; 174/152 G; 248/56; 16/2.2
(58) Field of Search ............................ 174/65 G, 65 R, 174/152 G, 153 G; 248/56; 16/2.1, 2.2

(56) References Cited

U.S. PATENT DOCUMENTS

| | | | |
|---|---|---|---|
| 2,225,472 A | * 12/1940 | Franklin | ..................... 277/604 |
| 2,420,826 A | 5/1947 | Irrgang | |
| 2,800,526 A | * 7/1957 | Moorhead | ............... 174/153 G |
| 3,562,847 A | 2/1971 | Jemison | |
| 4,535,196 A | 8/1985 | Milne | |
| 4,640,479 A | 2/1987 | Shely et al. | |
| 4,809,937 A | 3/1989 | Emory, Jr. | |
| D312,383 S | 11/1990 | Hill et al. | |
| 5,093,957 A | * 3/1992 | Do | ............................... 16/2.1 |
| 5,374,017 A | 12/1994 | Martin et al. | |
| 5,442,141 A | 8/1995 | Gretz | |
| 5,453,579 A | * 9/1995 | Cohea | ..................... 174/153 G |
| 5,607,323 A | 3/1997 | Foster et al. | |
| 5,627,342 A | 5/1997 | Kramer | |
| 5,806,139 A | * 9/1998 | Anderson et al. | ............. 16/2.1 |
| 5,808,140 A | 9/1998 | Haridas | |
| 5,950,277 A | * 9/1999 | Tallmadge et al. | ............ 16/2.1 |
| 6,143,982 A | 11/2000 | Gretz | |

* cited by examiner

Primary Examiner—Dhiru R Patel
(74) Attorney, Agent, or Firm—Leffert Jay & Polglaze, P.A.

(57) ABSTRACT

A grommet having a longitudinal slot formed through the head and body thereof to expose a bore formed entirely through the body of the grommet may be assembled with a pin extending from the undersurface of a primary panel by addressing the slot formed through the body of the grommet to the pin and applying pressure to the body of the grommet opposite the slot. A detent structure extending inwardly from the body of the grommet into the bore formed therethrough is constructed and arranged to engage a flat formed into the base of the pin and to thereby prevent the longitudinal extraction of the pin from the grommet. The pre-assembled pin and grommet may then be inserted into a bore formed through a secondary panel to effect a blind connection between the primary and secondary panels. Retaining mechanisms on the exterior of the body retain the grommet within the bore formed in the secondary panel and may be adapted to accommodate varying thickness in the secondary panel.

20 Claims, 2 Drawing Sheets

C-SHAPED GROMMET

This application claims the benefit of Provisional Application No. 60/376,980, filed Apr. 30, 2002.

FIELD OF THE INVENTION

The present invention relates to a grommet constructed and arranged to make a blind connection between a primary panel and a secondary panel. More specifically, the grommet of the present invention may be laterally secured to a pin extending from the undersurface of the primary panel.

SUMMARY OF THE INVENTION

The present invention can best be summarized as a side mounting grommet that comprises a body having an aperture formed entirely therethrough and a head that extends laterally from its upper end and which acts to limit the depth of insertion of the body into a bore that is formed into a panel. Both the body and the head have a slot formed therethrough that communicates with the aperture formed through the body. This slot allows the grommet to be addressed laterally to a pin that extends from the underside of a primary panel such that the pin is received within the aperture.

A detent structure formed within the aperture of the body extends into the aperture and is constructed and arranged to engage a flat or depression formed near the base of the pin such that once the pin is seated within the aperture of the grommet's body, the pin may not easily be withdrawn longitudinally from the bore. At least one retaining mechanism on the exterior surface of the body of the grommet acts to retain the grommet, and the pin that has been pre-assembled therewith, within a bore formed in a secondary panel. Typically, the connection made between the primary and secondary panels is considered "blind", i.e., the pre-assembled pin and grommet are not visible as they are being inserted into the bore formed through the secondary panel.

One advantage of the grommet of the present invention is that it may be disassembled for the purposes of repair or replacement of the panels or related structures. To facilitate this, the cooperative bearing surfaces of the depression formed in the pin and/or the bearing surfaces of the detent structure may be constructed and arranged to impose a predetermined withdrawal force upon the grommet. Forming an angled or curvilinear surface on one or both of the detent structure and depression will allow one or both of these structures to be biased or elastically deformed such that the pin may be removed longitudinally from the aperture in the grommet body. The withdrawal force required to remove the pin longitudinally from the body may be larger or smaller than the force required to remove the body of the grommet from the bore formed in the secondary panel when the grommet and pin are received therein.

To further facilitate the disassembly of the grommet of the present invention, the head of the grommet may be provided with release apertures that allow a user to pry or bias the retaining mechanism(s) that retain the grommet body in the bore in the secondary panel inwardly such that the grommet body may be removed from the bore.

The present invention also comprises a method of creating a blind connection between a primary and a secondary panel. The process begins with the step of providing a pin on the underside of the primary panel. This pin may be formed integral with the panel in a molding operation or it may be adhered or mechanically secured thereto after the primary panel has been manufactured. A grommet having a body constructed as described herein is then assembled with the pin by addressing a longitudinal slot in the grommet body to the pin and forcing the grommet body onto the pin such that the pin is received and retained within the aperture formed through the body of the grommet. Once the grommet and pin have been pre-assembled, the grommet, with the pin received therein, is inserted into a bore formed through the secondary panel until the retaining structures on the grommet body engage the secondary panel, thereby securing the primary panel to the secondary panel. Disassembly of the primary and secondary panel is undertaken by first applying a withdrawal force to the pin. Note that this withdrawal force is typically applied by prying the primary panel away from the secondary panel but may be applied directly to the pin itself where a suitable tool can be addressed thereto. Once the pin has been withdrawn from the grommet body, the retaining structures are accessed through the release apertures formed in the head of the grommet body and biased away from the bore in the secondary panel to a degree that allows the grommet body to be removed from the bore.

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

DETAILED DESCRIPTION OF THE INVENTION

Figure 1:
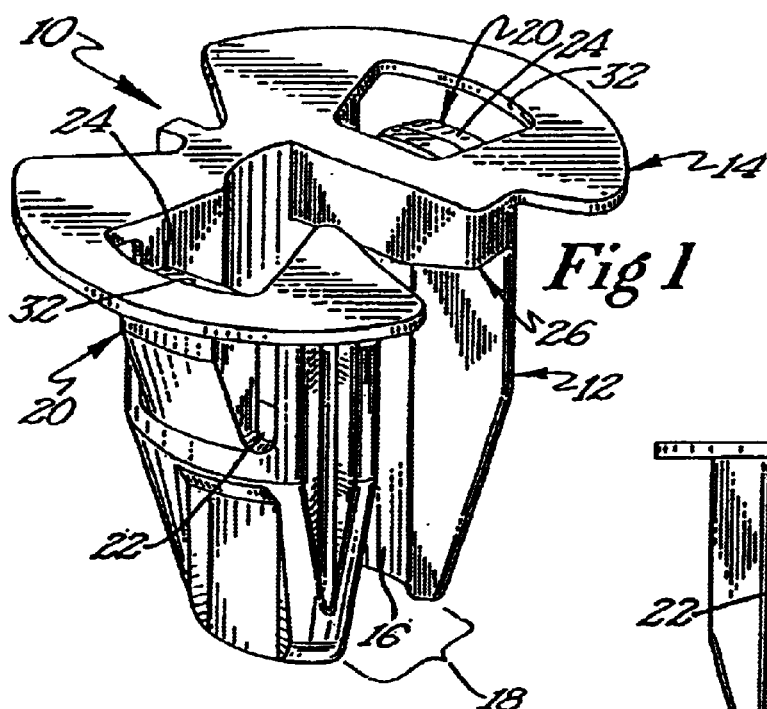
FIG. 1 is a perspective view of a grommet constructed according to the present invention.
Figure 2:
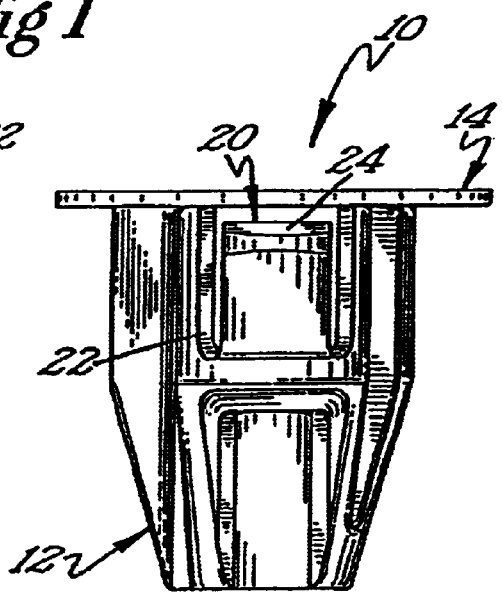
FIG. 2 is a rear elevation of the grommet of FIG. 1.
Figure 3:
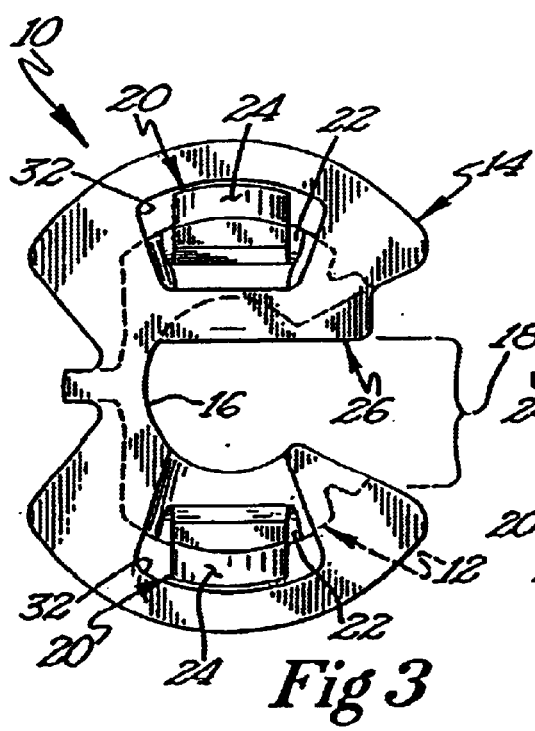
FIG. 3 is a top plan view of the grommet of FIG. 1.
Figure 4:
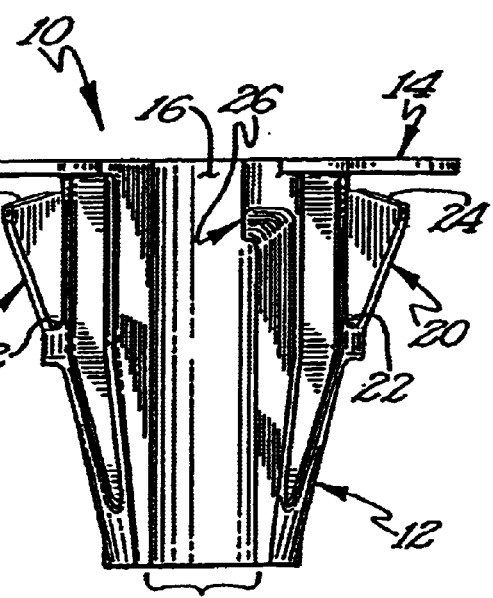
FIG. 4 is a front elevation view of grommet of FIG. 1.

As can be seen in FIGS. 1–4, the C-Shaped Grommet 10 of the present invention comprises a longitudinally extending body 12 and a laterally extending head 14 secured to an upper end of the body 12. The body 12 and head 14 have a longitudinal bore 16 formed entirely therethrough. The body 12 and head 14 further comprise a slot 18 that runs the entire length of the body 12, opening the bore 16 along its entire length, and which further extends through the head 14.

The head 14 extends laterally from the body 12 so as to limit the insertion of the body 12 into a bore 11 formed through a secondary panel 9, often the framework of an automobile or the like. The head 14 is generally circular but may also be butterfly shaped as illustrated in the figures.

The body 12 of the grommet 10 is provided on its exterior with at least one retaining mechanism 20. The retaining mechanisms 20 may be of any construction suitable to retain the body 12 of the grommet 10 within the bore 11 formed in the secondary panel 9. The retaining mechanisms 20 of the preferred embodiment illustrated in FIGS. 1–4 comprise a flexible tab that is situated within a tab aperture 22 formed through the wall of the body 12 of the grommet 10. The retaining mechanisms 20 are cantilevered from a bottom surface of the tab aperture 22 and are sufficiently flexible such that as the body 12 of the grommet 10 is inserted into the bore formed into the secondary panel 9, the retaining mechanisms 20 will be biased inwardly toward the bore 16 of the grommet 10. In this manner, the body 12 of the grommet 10 may be fully inserted into the bore 11 formed in the secondary panel 9. Once the grommet 10 is fully inserted into the bore 9 in the secondary panel 11, the retaining mechanisms 20 will be resiliently biased back to their initial position, i.e., will protrude laterally from the body 12 of the grommet so as to engage the undersurface of the secondary panel, thereby trapping the secondary panel 9 between the undersurface of the head 14 and the engaging surface 24 of the retaining mechanisms lobs 20. As can be appreciated from FIG. 6, the thickness of the secondary panel 9 will dictate how far the retaining mechanisms 20 must be placed from the undersurface of the head 12 of the grommet 10. For a thicker secondary panel 9, the retaining mechanisms 20 must be a correspondingly larger distance from the undersurface of the head 12. Note that the retaining mechanisms 20 may be of any suitable configuration, including solid detents, raised ridges, or the like.

Figure 5:
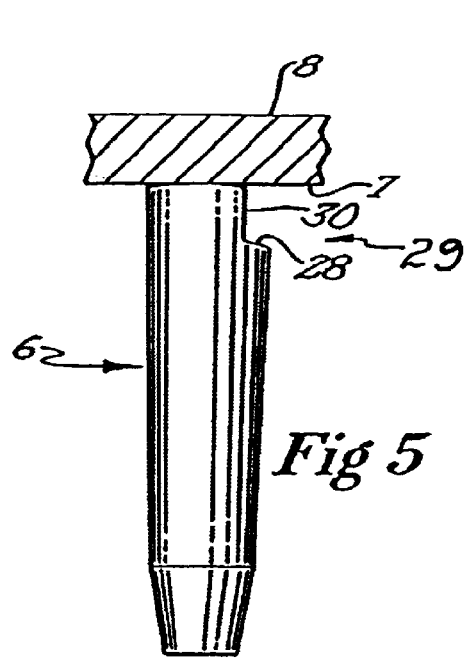
FIG. 5 is a front elevation view of a pin extending from the undersurface of a primary panel.

FIG. 5 illustrates a pin 6 that extends downwardly from the undersurface 7 of a primary panel 8. The grommet 10 is constructed and arranged such that when the slot 18 formed through the side of the body 12 of the grommet is addressed to the pin longitudinally, the grommet 10 may be seated onto the shaft of the pin 6 by applying pressure to the portion of the body 12 of the grommet 10 opposite the position of the slot 18. The grommet 10 is provided with a detent structure 26 at the top portion of the bore 16 adjacent the head 14 of the grommet 10. Detent structure 26 extends into bore 16 and is constructed and arranged to engage a depression 29 formed into the base of the pin 6 adjacent the undersurface 7 of the primary panel 8. The detent structure 26 engages a shoulder 28 of a flat 30 that in the illustrated embodiment forms the depression 29. The detent structure 26 seats firmly within the flat 30 formed in the pin 6 and the interaction of the shoulder 28 with the detent structure 26 prevents the grommet 10 from being slid from the pin 6 longitudinally. As the pin 6 may not be removed longitudinally from the grommet 10, the grommet 10 can maintain a significant connecting force between the primary and secondary panels 8, 9.

Figure 7:
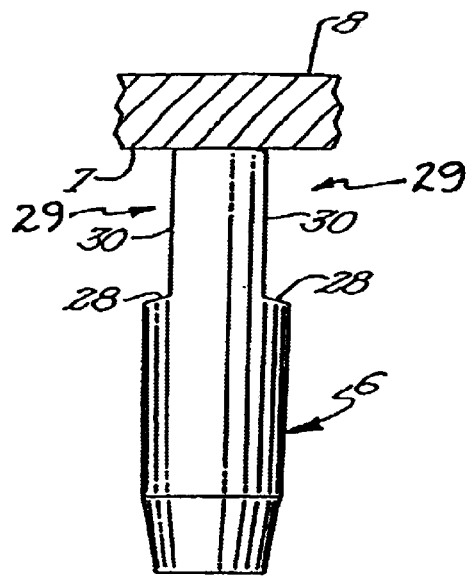
Figure 8:
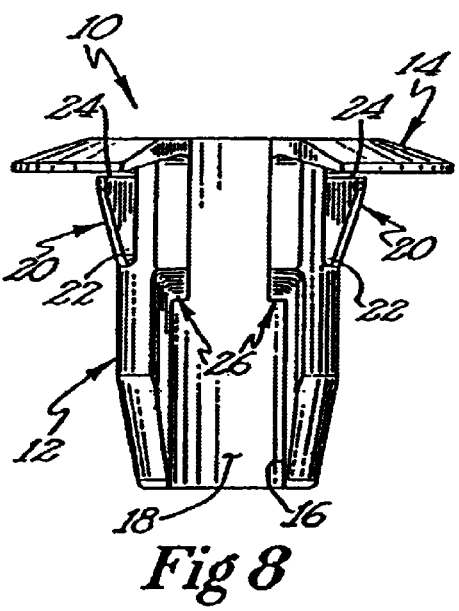

An alternate embodiment of the grommet is illustrated in FIGS. 7 and 8. FIG. 7 illustrates a pin 6' having two depressions 29 with two flats 30 formed therein, each flat having a shoulder 28. The grommet 10' is similar to the grommet 10 illustrated in FIGS. 1–6. Grommet 10' is provided with a second detent structure 26 that engages the second flat 30 formed into the base of the pin 6'.

In yet another embodiment of the present invention, the head of the grommet 10 may be omitted. In this instance, the retaining mechanisms 20 of the grommet body 12 would act to retain the primary panel 8 to a secondary panel 9 in the same manner as a grommet 10 having a head.

Figure 6:
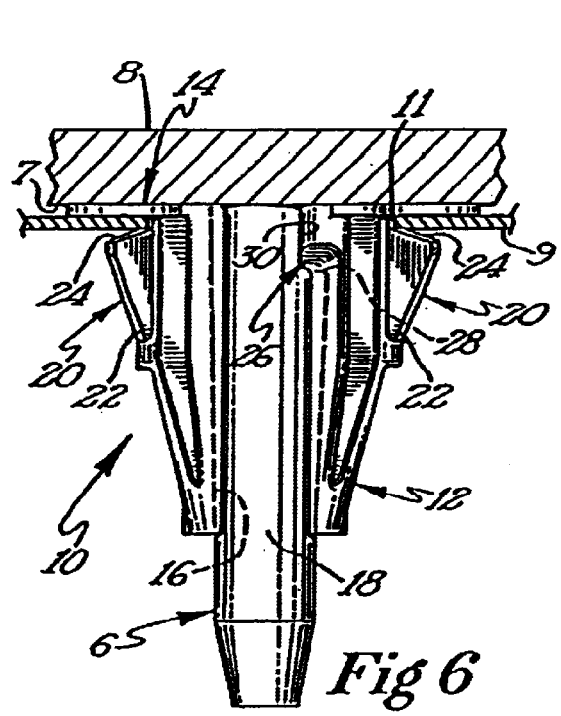
FIG. 6 is a front elevation view of the pin of FIG. 5 having a grommet secured thereto; and, FIG. 7 is a front elevation view of an alternate embodiment of a pin extending from the undersurface of a primary panel having two shoulders formed therein; and, FIG. 8 is a front elevation of an alternate embodiment of a grommet of the present invention having two detent structures.

In operation, the slot 18 of the grommet 10 is addressed to the side of the pin 6 such that the detent structure 26 is aligned with the flat 30 formed at the base of the pin 6. Pressure is applied to the body 12 of the grommet 10 opposite the slot 18 to deflect the resilient body 12 outwardly so that the pin 6, being slightly wider than the slot 18, may pass through the slot and into the bore 16 formed through the grommet 10. At the same time, the detent structure 26 will be firmly seated within the flat 30 such that the detent structure 26 engages the shoulder 28 of the slot. The pre-assembled pin 6 and grommet 10 are then inserted into a bore 11 formed through a secondary panel 9 as illustrated in FIG. 6.

As the body 12 of the grommet 10 passes into the bore 11, the retaining mechanisms 20 are inwardly biased to permit the body 12 to be inserted into the bore 11. Once the undersurface of the head 14 of the grommet 10 has contacted the upper surface of the secondary panel 9, or has come within a predetermined distance thereof, the resilient nature of the retaining mechanisms 20 biases the retaining mechanisms 20 outwardly such that the bearing surfaces 24 thereof may engage the undersurface of the secondary panel 9. Because the retaining mechanisms 20 blocks the removal of the pin 6 from the grommet 10 longitudinally and the bore 11 prevents the lateral exit of the pin 6 from the grommet 10, the grommet 10 securely connects the primary panel 8 to the secondary panel 9.

Disassembly of the connection between the primary and secondary panels 8, 9 may be accommodated by forming the shoulder 28 of the flat 30 at a slight downward angle such that as the pin 6 is pulled outwardly from the grommet 10, the detent structure 26 will act to outwardly deflect the body 12 to the extent necessary to remove the pin 6 therefrom. The withdrawal force necessary to remove the pin 6 from the grommet 10 in this manner can be controlled by modifying the geometry of the shoulder 28 and the detent structure 26 so as to increase or decrease the likelihood that the body 12 will be deflected outwardly to a degree wherein the pin 6 may be removed from the bore 16 of the grommet 10. In the preferred embodiment illustrated in the figures, the head 14 of the grommet 10 has been provided with release apertures 32 that allow access to the retaining mechanisms 20. In this manner, one may access the retaining mechanisms 20 so as to pry them inwardly to release the grommet 10 from the bore 11.

In yet another embodiment, it may prove desirable to form the retaining mechanisms 20 in such a way that the hold that the grommet maintains on the pin 6 exceeds the hold that the retaining mechanisms 20 have on the secondary panel 9. In this manner, by gently prying outwardly on this primary panel 8, the grommet 10 may be removed from the bore 11 formed in the secondary panel 9 so that the primary panel may be removed for maintenance or the like.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A side mounting grommet comprising:
   a body having a peripheral wall that defines an aperture that passes through the body longitudinally, the peripheral wall having a slot formed therethrough that exposes the entire length of the aperture;
   a head extending laterally from an upper end of the body so as to limit the depth of insertion of the body into a bore formed in a secondary panel; the head also having a slot formed therein that is aligned with the slot in the peripheral wall of the body;
   a detent structure extending inwardly into the aperture defined by the body, the detent structure being constructed and arranged to engage a depression formed near the base of a pin extending from the undersurface of a primary panel; and, a retaining mechanism formed into the exterior surface of the peripheral wall of the body, the retaining mechanism being constructed and arranged to engage an edge of the bore formed through the secondary panel opposite the side of the secondary panel engaged by the head of the body, the head and the retaining mechanism cooperating to retain the body of the grommet within the bore in the secondary panel.

2. The grommet of claim 1 wherein the grommet is assembled with the pin extending from the undersurface of the primary panel prior to insertion into the bore formed in the secondary panel.

3. The grommet of claim 1 wherein a distal bearing surface of the depression formed near the base of the pin is constructed and arranged with respect to the detent structure such that a withdrawing force applied to the pin will cause the detent structure to be biased outwardly, thereby releasing the pin from the aperture of the grommet.

4. The grommet of claim 3 wherein the detent structure is constructed and arranged to maintain a weaker hold on the pin than does the retaining mechanism upon the secondary panel, thereby allowing the conjoined primary and secondary panels to be separated by withdrawing the pin from the aperture in which it is received.

5. The grommet of claim 1 wherein a bearing surface of the detent structure is constructed and arranged with respect to the depression formed near the base of the pin such that a withdrawing force applied to the pin will cause the detent structure to be biased outwardly, away from the depression formed in the pin, thereby releasing the pin from the aperture of the grommet.

6. The grommet of claim 5 wherein the detent structure is constructed and arranged to maintain a weaker hold on the pin than does the retaining mechanism upon the secondary panel, thereby allowing the conjoined primary and secondary panels to be separated by withdrawing the pin from the aperture in which it is received.

7. The grommet of claim 1 wherein the detent structure is constructed and arranged to maintain a stronger bold on the pin than does the retaining mechanism upon the secondary panel, thereby allowing the conjoined primary and secondary panels to be separated by withdrawing the body of the grommet from the bore in which it is received.

8. The grommet of claim 1 wherein the head of the grommet has a release aperture formed therethrough, the release aperture being constructed and arranged to allow the detent structure to be biased inwardly so as to release the body of the grommet from the bore formed in the secondary panel.

9. The grommet of claim 1 wherein the body comprises two detent structures that cooperatively mate with respective depressions formed near the base of the pin.

10. The grommet of claim 9 wherein the head of the grommet has two release apertures formed therethrough, the release apertures being constructed and arranged to allow the respective detent structures to be biased inwardly so as to release the body of the grommet from the bore formed in the secondary panel.

11. A grommet for making a blind connection between a primary and a secondary panel, the grommet comprising:

a body having a peripheral wall that defines an aperture that passes through the body longitudinally, the peripheral wall having a slot formed therethrough that exposes the entire length of the aperture;

a head extending laterally from an upper end of the body so as to limit the depth of insertion of the body into a bore formed in a secondary panel; the head also having a slot formed therein that is aligned with the slot in the peripheral wall of the body;

a detent structure extending inwardly into the aperture defined by the body, the detent structure being constructed and arranged to engage a depression formed near the base of a pin extending from the undersurface of a primary panel;

a retaining mechanism formed into the exterior surface of the peripheral wall of the body, the retaining mechanism being constructed and arranged to engage an edge of the bore formed through the secondary panel opposite the side of the secondary panel engaged by the head of the body, the head and the retaining mechanism cooperating to retain the body of the grommet within the bore in the secondary panel, the body of the grommet being assembled with the pin extending from the undersurface of the primary panel prior to the insertion of the body into the bore formed in the secondary panel; and, a release aperture formed through the head of the body, the release aperture being constructed and arranged to allow the detent structure to be biased inwardly so as to release the body of the grommet from the bore formed in the secondary panel.

12. The grommet of claim 11 wherein a distal bearing surface of the depression formed near the base of the pin is constructed and arranged with respect to the detent structure such that a withdrawing force applied to the pin will cause the detent structure to be biased outwardly, thereby releasing the pin from the aperture of the grommet.

13. The grommet of claim 12 wherein the detent structure is constructed and arranged to maintain a weaker hold on the pin than does the retaining mechanism upon the secondary panel, thereby allowing the conjoined primary and secondary panels to be separated by withdrawing the pin from the aperture in which it is received.

14. The grommet of claim 11 wherein a bearing surface of the detent structure is constructed and arranged with respect to the depression formed near the base of the pin such that a withdrawing force applied to the pin will cause the detent structure to be biased outwardly, away from the depression formed in the pin, thereby releasing the pin from the aperture of the grommet.

15. The grommet of claim 14 wherein the detent structure is constructed and arranged to maintain a weaker hold on the pin than does the retaining mechanism upon the secondary panel, thereby allowing the conjoined primary and secondary panels to be separated by withdrawing the pin from the aperture in which it is received.

16. The grommet of claim 11 wherein the detent structure is constructed and arranged to maintain a stronger hold on the pin than does the retaining mechanism upon the secondary panel, thereby allowing the conjoined primary and secondary panels to be separated by withdrawing the body of the grommet from the bore in which it is received.

17. A method of securing a primary panel to a secondary panel in a blind connection, the method comprising the steps of:

providing a pin that extends from an undersurface of the primary panel, the pin having a depression formed near a base thereof;

providing a grommet having a body that comprises a peripheral wall that defines an aperture that passes through the body longitudinally, the peripheral wall having a slot formed therethrough that exposes the entire length of the aperture, a head extending laterally from an upper end of the body so as to limit the depth of insertion of the body into a bore formed in a secondary panel; the head also having a slot formed therein that is aligned with the slot in the peripheral wall of the body, a detent structure extending inwardly into the aperture defined by the body, the detent structure being constructed and arranged to engage the depression formed in the pin, and a retaining mechanism formed into the exterior surface of the peripheral wall of the body, the retaining mechanism being constructed and arranged to engage an edge of the bore formed through the secondary panel opposite the side of the secondary panel engaged by the head of the body, the head and the retaining mechanism cooperating to retain the body of the grommet within the bore in the secondary panel;

assembling the grommet with the pin by pressing the pin into the aperture in the body of the grommet through the slot formed therein; and, inserting the grommet and pin into the bore formed in the secondary panel so as to permit the retaining structure of the body to engage the secondary panel, thereby securing the primary panel to the secondary panel.

18. The method of securing a primary panel to a secondary panel in a blind connection of claim 17 further comprising the step of disassembling the primary and secondary panel by applying a withdrawing force to the pin such that the detent structure releases the pin from the aperture of the grommet body.

19. The method of securing a primary panel to a secondary panel in a blind connection of claim 18 wherein the head of the grommet body further comprises a release aperture and wherein the step of disassembling the primary and secondary panels further includes accessing the retaining mechanisms through the release apertures and biasing the retaining mechanisms inwardly away from the bore formed in the secondary panel so as to release the grommet body from the bore in the secondary panel.

20. A side mounting grommet comprising:

a body having a peripheral wall that defines an aperture that passes through the body longitudinally, the peripheral wall having a slot formed therethrough that exposes the entire length of the aperture;

a detent structure extending inwardly into the aperture defined by the body, the detent structure being constructed and arranged to engage a depression formed near the base of a pin extending from the undersurface of a primary panel; and, a retaining mechanism formed into the exterior surface of the peripheral wall of the body, the retaining mechanism being constructed and arranged to engage an edge of the bore formed through the secondary panel opposite the primary panel, the retaining mechanism acting to retain the body of the grommet within the bore in the secondary panel.

* * * * *